(12) United States Patent
Pentzer

(10) Patent No.: US 10,583,996 B1
(45) Date of Patent: Mar. 10, 2020

(54) BREAD HANDLER

(71) Applicant: JLS Automation, York, PA (US)

(72) Inventor: Jonathan M. Pentzer, Hampstead, MD (US)

(73) Assignee: JLS Automation, York, PA (US)

( * ) Notice: Subject to any disclaimer, the term of this patent is extended or adjusted under 35 U.S.C. 154(b) by 0 days.

(21) Appl. No.: 16/250,127

(22) Filed: Jan. 17, 2019

(51) Int. Cl.
    *B65B 35/36* (2006.01)
    *B65B 35/30* (2006.01)
    *B65B 35/00* (2006.01)
    *B65G 47/24* (2006.01)

(52) U.S. Cl.
    CPC ...... *B65G 47/24* (2013.01); *B65G 2201/0202* (2013.01)

(58) Field of Classification Search
    None
    See application file for complete search history.

(56) References Cited

U.S. PATENT DOCUMENTS

| 5,675,963 | A  | * | 10/1997 | Nicholson | ............... | B65B 5/061 |
|           |    |   |         |           |                 | 53/247     |
| 7,904,198 | B2 | * | 3/2011  | Hawes     | ................ | B25J 15/0253 |
|           |    |   |         |           |                 | 700/230    |
| 2010/0101191 | A1 | | 4/2010 | Lindee | | |

FOREIGN PATENT DOCUMENTS

DE  10 2016 225 888 A1  6/2018

OTHER PUBLICATIONS

Abstract of DE 10 2016 225 888, dated Jun. 21, 2018, 2 pages.

* cited by examiner

*Primary Examiner* — Kavel Singh
(74) *Attorney, Agent, or Firm* — Barley Snyder

(57) ABSTRACT

The invention relates to a bread handler. The bread handler has a plurality of paddles and a gripper. The paddles are on opposing sides and the gripper has two opposing arms with each arm having a lead surface and grip surface, the gripper moving in a sweeping motion in a longitudinal direction with the lead surfaces engaging the paddles.

24 Claims, 11 Drawing Sheets

BREAD HANDLER

FIELD OF THE INVENTION

The invention is related to a bread handler, and more particularly a bread handler with a robotic arm.

BACKGROUND

Segmented food products such as sliced bread, for example are commonly handled by mechanical devices in facilities in high volumes and at rapid speeds. Such facilities may include, a food manufacturing plant, a restaurant, or other distribution or handling facilities. An inherent problem with the common handling devices is that for segmented food products damage may occur due to too great a pressure or force being applied to safely handle the product. Segmented food products are not generally mechanically strong or resilient to compression. The segments, or slices in the example of bread, tend to decouple under slight planar misalignment. In general the segments may be non-uniform and have different surface textures or levels of lubricity.

Likewise, if the segmentation is numerous or the product is dimensionally large then the required number of segmented food product stabilizers or tooling for handling the product becomes cumbersome and inefficient. Additionally, when segmented food products experience excessive handling, product defects occur such as tearing, compaction, crushing, and dust creation, the end result may be that the food product is unusable for its intended purpose. Such segmented food product handling concerns result in unacceptable amounts of product waste or damaged product as a result of the state of the art handling. On a commercial scale, such product handling challenges create inefficiency and increased manufacturing cost. What is needed is a handler that permits segmented food products to be quickly and efficiently handled while minimizing damaged or lost segmented food product due to handling difficulties.

SUMMARY

A bread handler according to the invention has a plurality of paddles on opposing sides, a gripper with two opposing arms, each arm having a lead surface and a grip surface, the gripper moving in a sweeping motion in a longitudinal direction with the lead surfaces engaging the paddles.

BRIEF DESCRIPTION OF THE DRAWINGS

The invention will now be described by way of example with reference to the accompanying figures, of which.

DETAILED DESCRIPTION OF THE EMBODIMENT(S)

Figure 1:
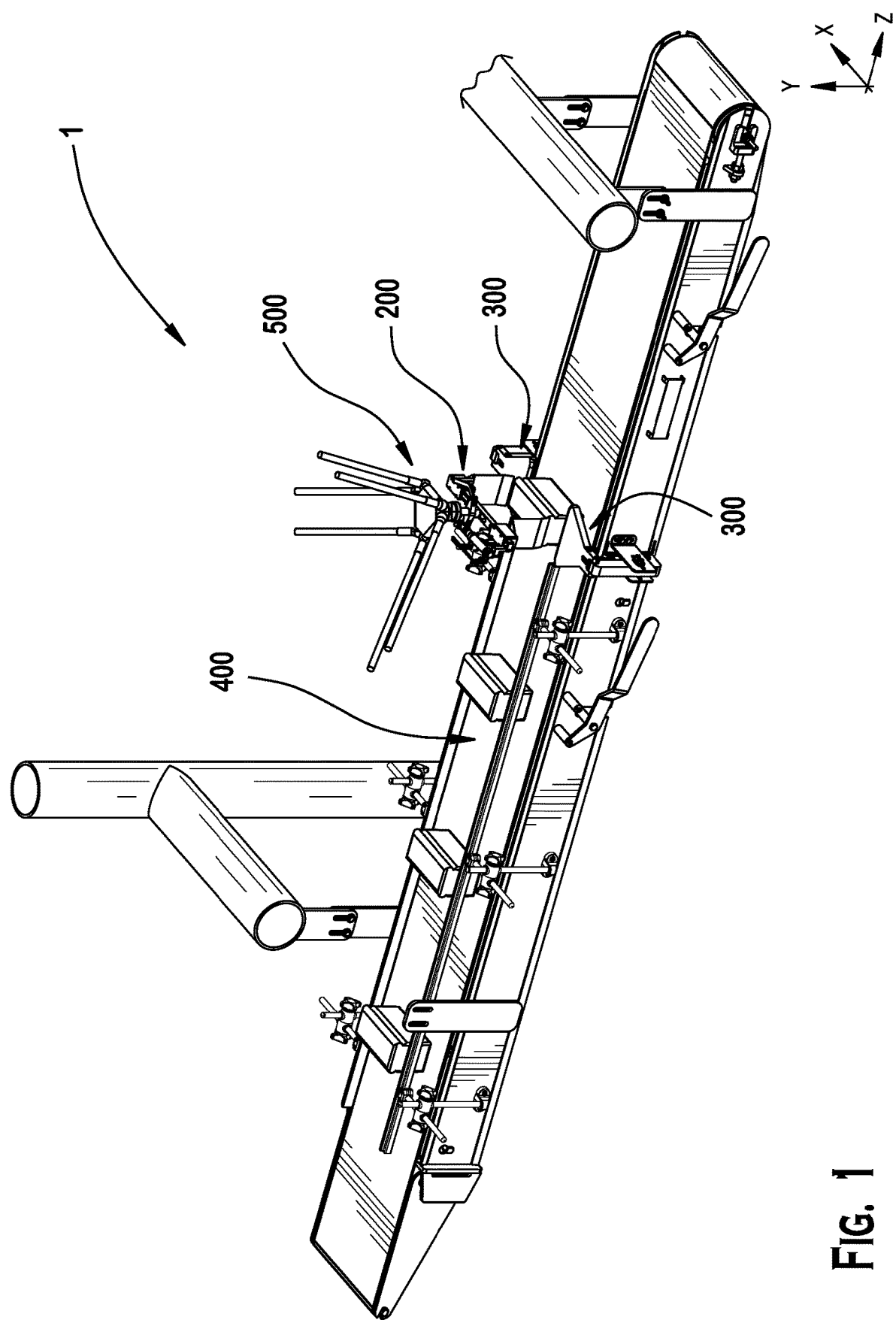
FIG. 1 is a perspective view of a bread handler according to the invention.

Exemplary embodiments of the invention will be described hereinafter in detail with reference to the attached drawings, wherein like reference numerals refer to like elements.

The invention may, however, be embodied in many different forms and should not be construed as being limited to the embodiments set forth herein; rather, these embodiments are provided so that the present disclosure will be thorough and complete, and will fully convey the concept of the disclosure to those skilled in the art.

Now with reference to the figures, an exemplary bread handler 1 according to the invention will be described. Referring first to FIG. 1, the bread handler 1 generally includes the following major components: a gripper assembly 200, a paddle assembly 300, a conveyor assembly 400 and a robotic arm 500.

Each of these major components will now be described in greater detail. Referring to FIGS. 1 through 4, the gripper assembly 200 generally includes a first arm 201 and a second arm 202, an arm actuator 240, and a robotic coupler 297.

In the shown embodiment, the first arm 201 is positioned opposite the second arm 202 with each arm having a lead surface 204 extending along the length of the arm. The first arm 201 and the second arm 202 both have a lower end 209. A gripper surface 205 extends up from the lower end 209 along an interior of each of the first arm 201 and the second arm 202. The gripper 205 extends through a partial elbow 208 formed on each of the first arm 201 and the second arm 202.

The first arm 201 and the second arm 202 are each individually adjacent the arm actuator 240 along a bottom surface 295. The arm actuator 240 has on an upper side a pneumatic drive mechanism 241. The pneumatic drive mechanism 241 has a baseplate 242 at an upper end, a pneumatic piston 230 along a side, a rotational drive coupler 260 having a center bore 245, and a mounting shaft 251, at a center on one end of the mounting shaft 251 are a pair of recesses 254 and on the opposite end is a central threaded opening 252.

Around a circumference 246, the base plate 242 has a plurality of openings 243 and a center bore 245. Along a lower side of the base plate 242 are a pair of receiving means 248. Positioned above the baseplate 242 is a robotic coupler 297.

Around a periphery of the rotational drive coupler 260 are a pair of collars 262. A slot 261 is formed in each one of the collars 262 to receive a first drive arm 256 having a cylindrical receiver 269 on opposite ends and a second drive arm 264 having a cylindrical receiver 269 on opposite ends. Along the outermost edges of the collars 262 are a plurality of receivers 263. The receivers 263 are formed in both the upper and lower ear of each one of the collars 262.

Figure 3:
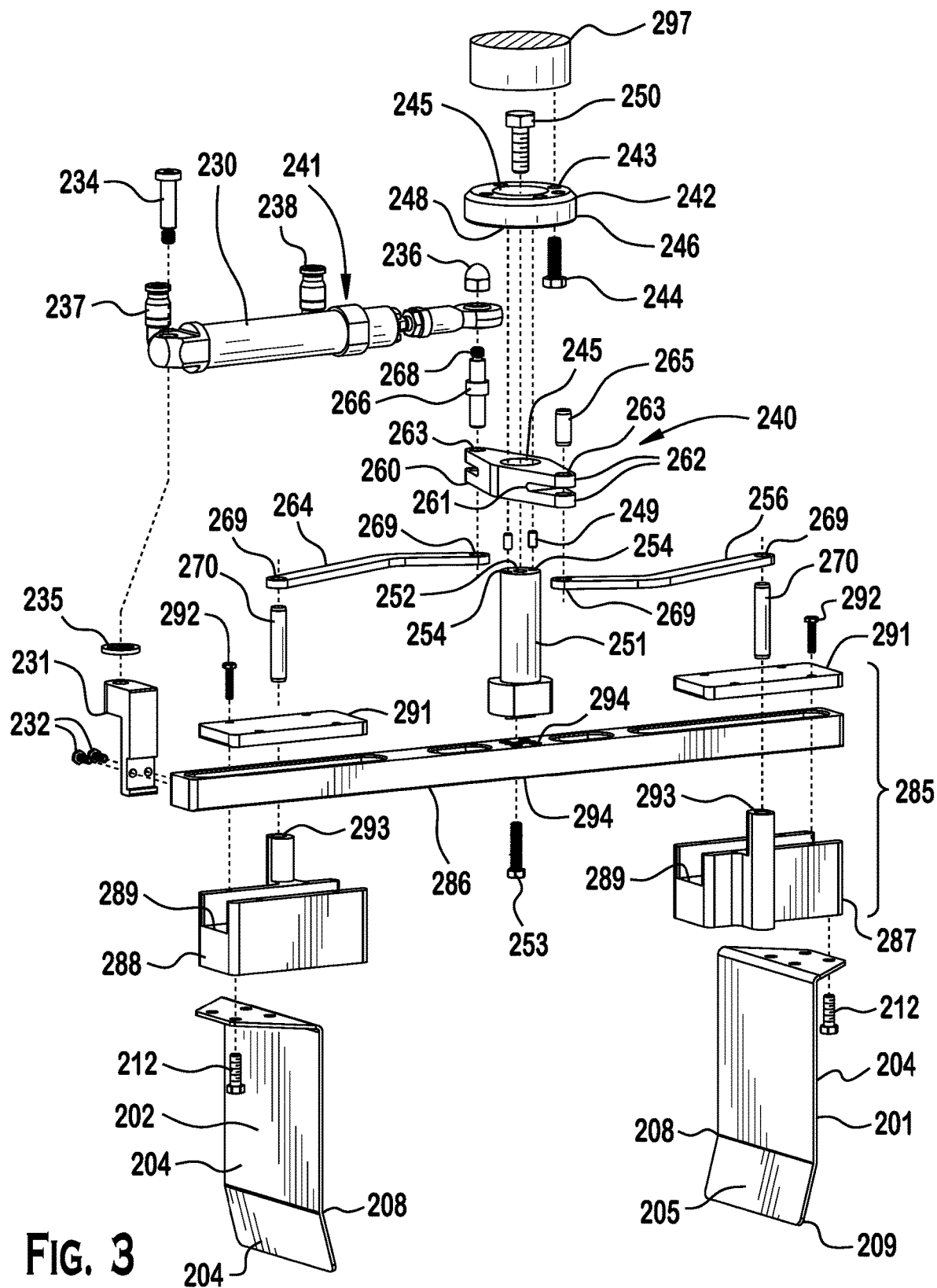
FIG. 3 is an exploded view of a gripper assembly of FIG. 1.

As shown in FIG. 3, the pneumatic piston 230 has along its length an air input port 237 and an air discharge port 238. Adjacent the pneumatic piston 230 at a distal end is a piston bracket 231.

Figure 2:
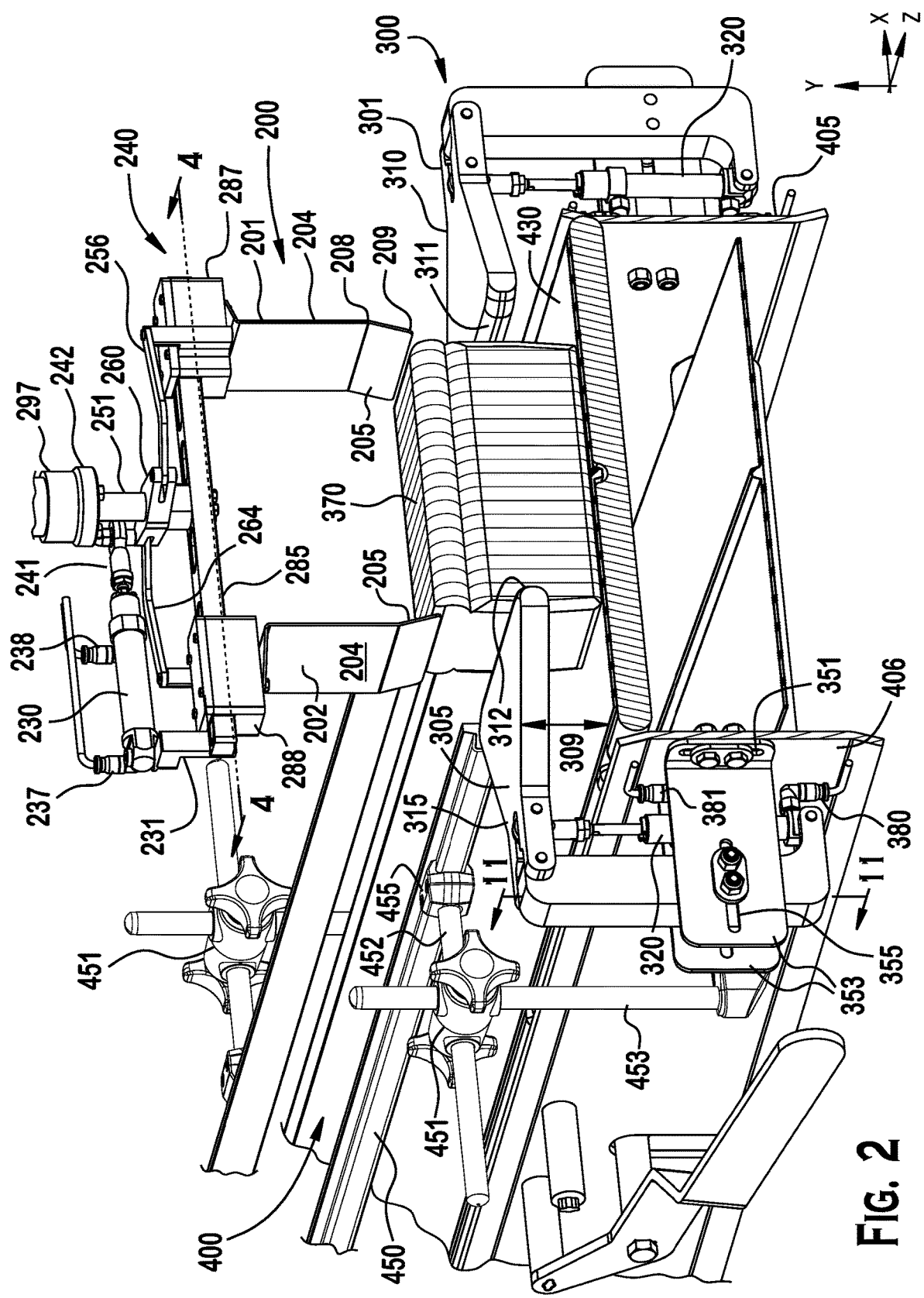
FIG. 2 is a side perspective view of a bread handler of FIG. 1.
Figure 4:
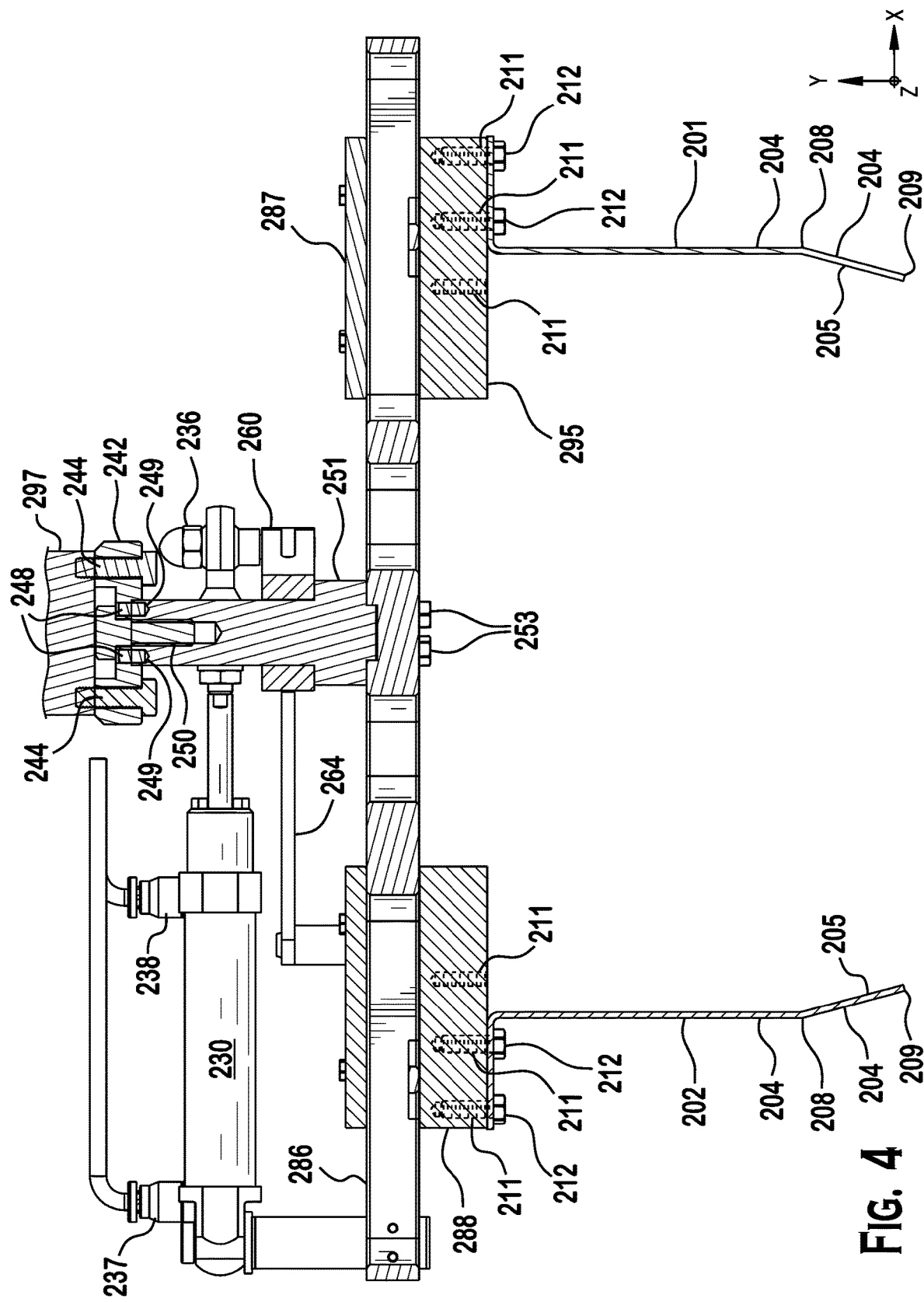
FIG. 4 is a cross-sectional view of a gripper assembly according to the invention taken along the line 4-4 of FIG. 2.

As shown in FIGS. 2-4, a slide rail sub-assembly 285, has a slotted slide rail 286 positioned in a horizontal x-direction. Along an end of the slotted slide rail 286 is a slide arm guide 287 and along an opposite end is a slide arm guide 288. A guide slot 289 is positioned along each one of the slide arm guide 287 and the slide arm guide 288. Along a side of the slide arm guide 287 and the slide arm guide 288 are cylindrical pin receiving recesses 293. Positioned above the slotted slide rail 286, corresponding to the slide arm guide 287 and the slide arm guide 288, are a plurality of upper plates 291. Along a center section of the slotted slide rail 286 are a plurality of threaded lower mounting shaft recesses 294. Along the bottom surface 295 of the slide arm guide 287 and the slide arm guide 288, are a plurality of adjustments recesses 211.

Figure 11:
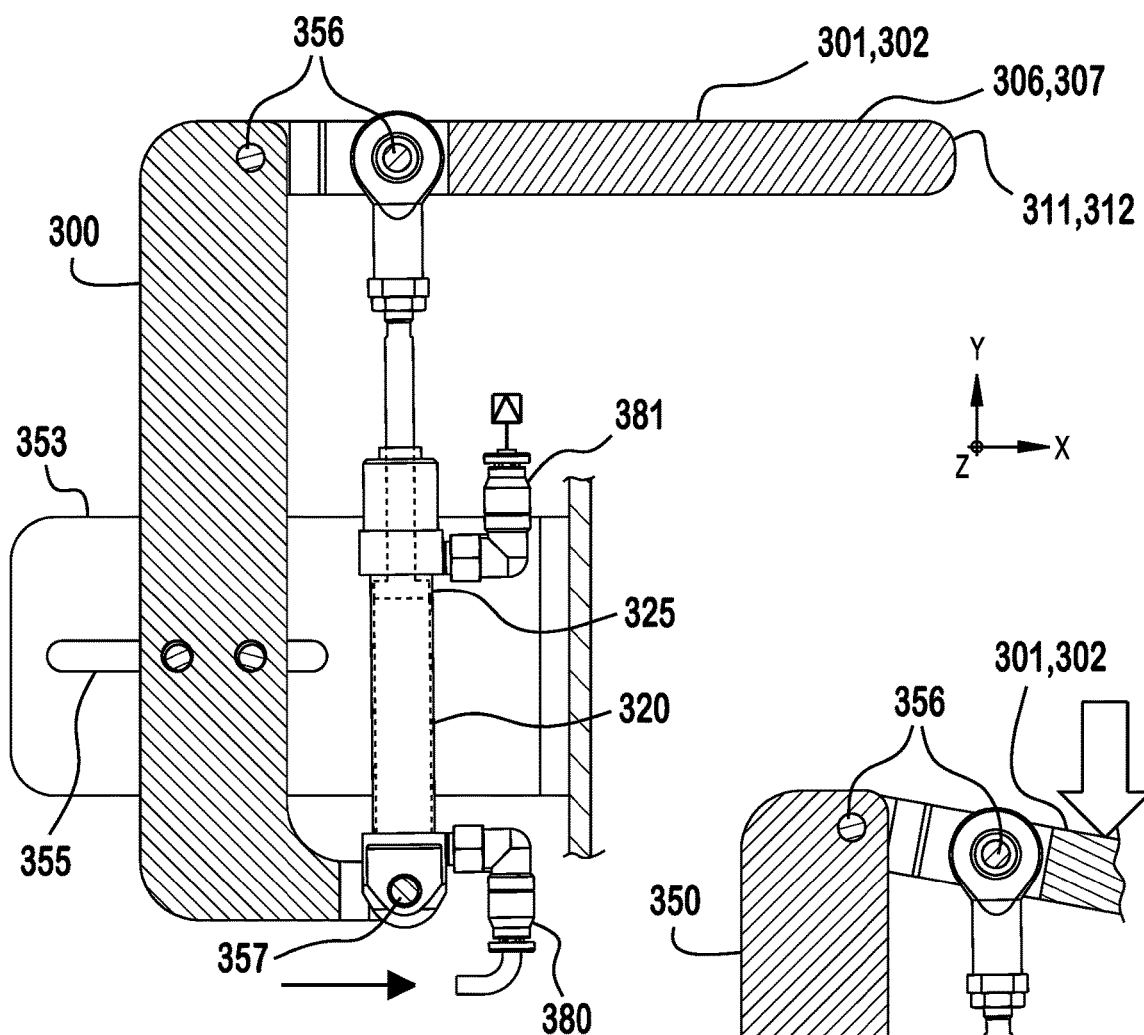
FIG. 11 is a sectional view of a paddle assembly of the invention shown in use.
Figure 12:
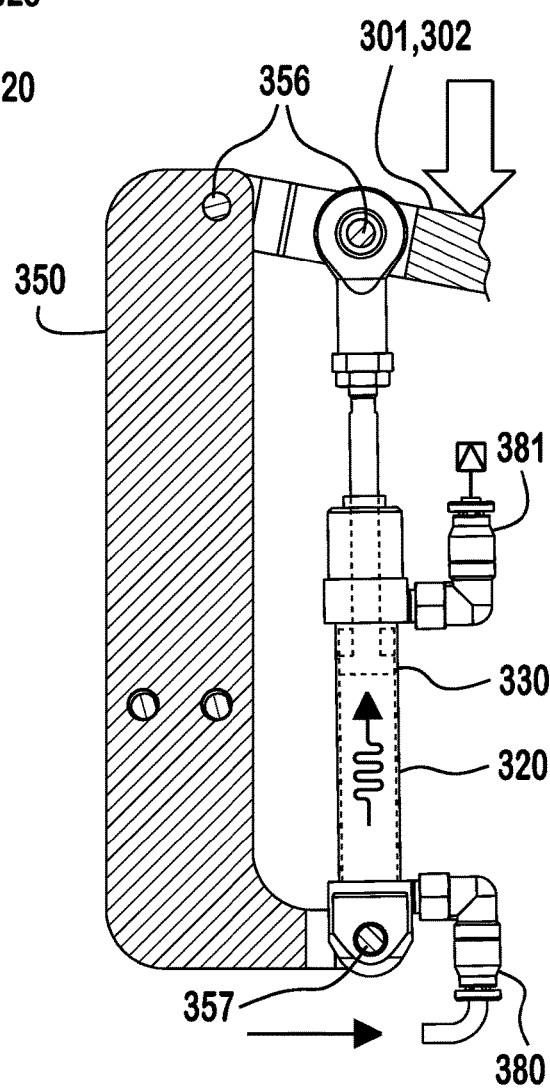
FIG. 12 is a sectional view of a paddle assembly of the invention shown in use.

Referring now to FIGS. 2 and 11-12, the paddle assembly 300 will be described in greater detail. It has a first paddle 301 and a second paddle 302 opposing one another in a horizontal x-direction. Further, the first paddle 301 and the second paddle 302 have a triangular shape 310. Along an end of the first paddle 301 is a first arm engagement position 306 and along the second paddle 302 is a second arm engagement position 307. At an innermost edge of the first paddle 301 is a first innermost radiused edge 311 and similarly along the second paddle 302 is a second innermost radiused edge 312. The first paddle 301 and the second paddle 302 are each positioned at a same paddle height 309 as a conveyor rail 450. Along a narrow angle 315 of each one of the first paddle 301 and the second paddle 302 is a pivot hinge 356.

The first paddle 301 and the second paddle 302 each have a pneumatic piston 320 with an air input port 380 and an air vent port 381. Positioned on lateral sides of the first paddle 301 and the second paddle 302 are a plurality of bracket plates 353. Along each one of the bracket plates 353 are a pair of horizontal adjustment slots 355 and a pair of vertical adjustment slots 351. Positioned between each pair of the bracket plates 353 is a mounting bracket 350. Along a distal end of the pneumatic piston 320 is a lower fastener 357.

Now the conveyor assembly 400 will be described in greater detail with reference to FIGS. 1 and 2. The conveyor assembly 400 extends in a longitudinal z-direction. It has a conveyor lateral side 405 and a conveyor lateral side 406 along which the conveyor rails 450 extend over the length of a conveyor belt 430. The conveyor rail 450 is positioned above the conveyor belt 430 in a vertical y-direction at the paddle height 309. There are a plurality of horizontal adjustment rods 452, a plurality of vertical adjustment rods 453, and a plurality of adjustment collars 451 along the length of the conveyor rail 450 adjacent to the conveyor rail 450.

Referring again to FIG. 1, the robotic arm 500 will now be described in greater detail. The robotic arm is a commercially available stainless steel (IP69K rated) delta robot of the type sold by JLS Automation. It is positioned above the gripper assembly 200 and the paddle assembly 300. The robotic arm 500 has a controller (not shown).

The assembly of the bread handler 1 will now be described. Referring to FIGS. 1 through 4, the gripper assembly 200 is configured to be movable in a plurality of directions and adjustable for various sized products. As shown in FIGS. 3 and 4, a plurality of bolts 244 enter the openings 243 securing the base plate 242 to the robotic coupler 297. The robotic arm 500 is connected to the gripper assembly 200 by the robotic coupler 297 along the top of the robotic coupler 297.

As shown in FIG. 3, positioned within the center bore 245 of the base plate 242 and the rotational drive coupler 260 is a bolt 250. Adjacent to the bolt 250 at an end, are a plurality of alignment pins 249. The alignment pins 249 are placed in a pair of recesses 254 in the mounting shaft 251. The bolt 250 passes into the center bore 245 of the base plate 242 and the rotational drive coupler 260. The alignment pins 249 are received into the receiving means 248 of the mounting shaft 251 and the mounting shaft 251 is secured to the base plate 242 via the bolt 250 connected to a central threaded opening 252.

As further illustrated in FIG. 3, a cylindrical pin 265 is passed through the receivers 263 into a cylindrical receiver 269 securing the first drive arm 256 to the rotational drive coupler 260. The second drive arm 264 is inserted along the other slot 261. A threaded cylindrical pin 266 is inserted into the receiver 263 passing into the cylindrical receiver 269 securing the second drive arm 264 to the rotational drive coupler 260. At an upper end 268, the threaded cylindrical pin 266, is attached to the pneumatic piston 230 via a nut 236. At a distal end, the pneumatic piston 230 is secured to the piston bracket 231 by a partially threaded bolt 234 with a washer 235. The piston bracket 231 is secured at the other end to the slide rail sub-assembly 285 by a plurality of screws 232.

Additionally as shown in FIG. 3, a plurality of cylindrical pins 270, are inserted into the first drive arm 256 and the second drive arm 264, and into a plurality of cylindrical receivers 269, positioned at the outermost end of each one of the first drive arm 256 and the second drive arm 264. The cylindrical pins 270 are then inserted into the pair of cylindrical pin receiving recesses 293 formed on the slide arm guide 287 and the slide arm guide 288.

Each one of the guide slots 289, along the slide arm guide 287 and the slide arm guide 288, partially enclose the slotted slide rail 286 along the slide arm guide 287 and the slide arm guide 288, when the upper plates 291 are fastened to the slide arm guide 287 and the slide arm guide 288 by the fasteners 292.

As shown in FIGS. 3 and 4, the slide rail sub-assembly 285 is connected to the pneumatic drive mechanism 241 and the base plate 242 when a plurality of lower mounting shaft bolts 253 are secured in the threaded lower mounting shaft recesses 294. The first arm 201 is secured to the slide arm guide 287 by screws 212 being inserted into the adjustment recesses 211 and the second arm 202 is secured to the slide arm guide 288 by the screws 212 being inserted into the adjustment recesses 211.

As shown in FIGS. 2 and 11-12, the first paddle 301 and the second 302 and the pneumatic piston 320, at an upper end, are each individually pivotally connected to one of the mounting brackets 350 by the pivot hinge 356 along the narrow angle 315. At a lower end, the pneumatic piston 320 is connected to the mounting bracket 350 by the fastener 357. Along the horizontal adjustment slots 355 the bracket plates 353 are secured to the mounting bracket 350 and along the vertical adjustment slots 351 the mounting brackets 350 are secured to the conveyor assembly 400 on the conveyor lateral side 405 and the conveyor lateral side 406. The first paddle 301 and the second paddle 302 are aligned with the conveyor rails 450, on the respective conveyor lateral side 405 and the conveyor lateral side 406 by the mounting brackets 350, the mounting bracket plate 353, the vertical adjustment slots 351 and the horizontal adjustment slots 355.

The plurality of horizontal adjustment rods 452 and the plurality of vertical adjustment rods 453 are connected to the conveyor rails 450 and the conveyors lateral side 405 and the conveyors lateral side 406 by the rail brackets 455. The plurality of adjustment collars 451 are movable along the plurality of horizontal adjustment rods 452 and the plurality of vertical adjustment rods 453 to align the conveyor rails 450 in the longitudinal z-direction, the horizontal x-direction and the vertical y-direction.

Operation of the bread handler 1 as best shown in FIGS. 1, 2, and 5-12, will now be described. The conveyor belt 430 moves in the longitudinal z-direction with a segmented product 370 thereon. As the segmented product 370 moves along the conveyor belt 430 the absolute position of the segmented product 370 is monitored at all times by the robotic arm 500. The segmented product 370 is contained within the conveyor rails 450 as it moves in the longitudinal z-direction preventing the segmented product 370 from decoupling. As the segmented product 370 nears the end of the conveyor rails 450 and approaches the first paddle 301 and the second paddle 302, the segmented product 370 is then supported by the first paddle 301 and second paddle 302 in the longitudinal z-direction, horizontal x-direction and the vertical y-direction along the first innermost radiused edge 311 and the second innermost radiused edge 312.

The pneumatic pistons 320 on the paddle assembly 300 are individually supplied with a compressed gas, such as an air, in the air input ports 380. The pneumatic piston 320 is pressurized and raises the first paddle 301 and the second paddle 302 to the paddle height 309 in a fully pressurized position 325 so that the first paddle 301 and the second paddle 302 are not pivoted downward towards the conveyor belt 430 as the segmented product 370 comes in contact with the first innermost radiused edge 311 and the second innermost radiused edge 312.

The first innermost radiused edge 311 and the second innermost radiused edge 312 prevent the segmented product 370 from decoupling in the horizontal x-direction along a plurality of vertical segments in a y-direction 371.

Figure 5:
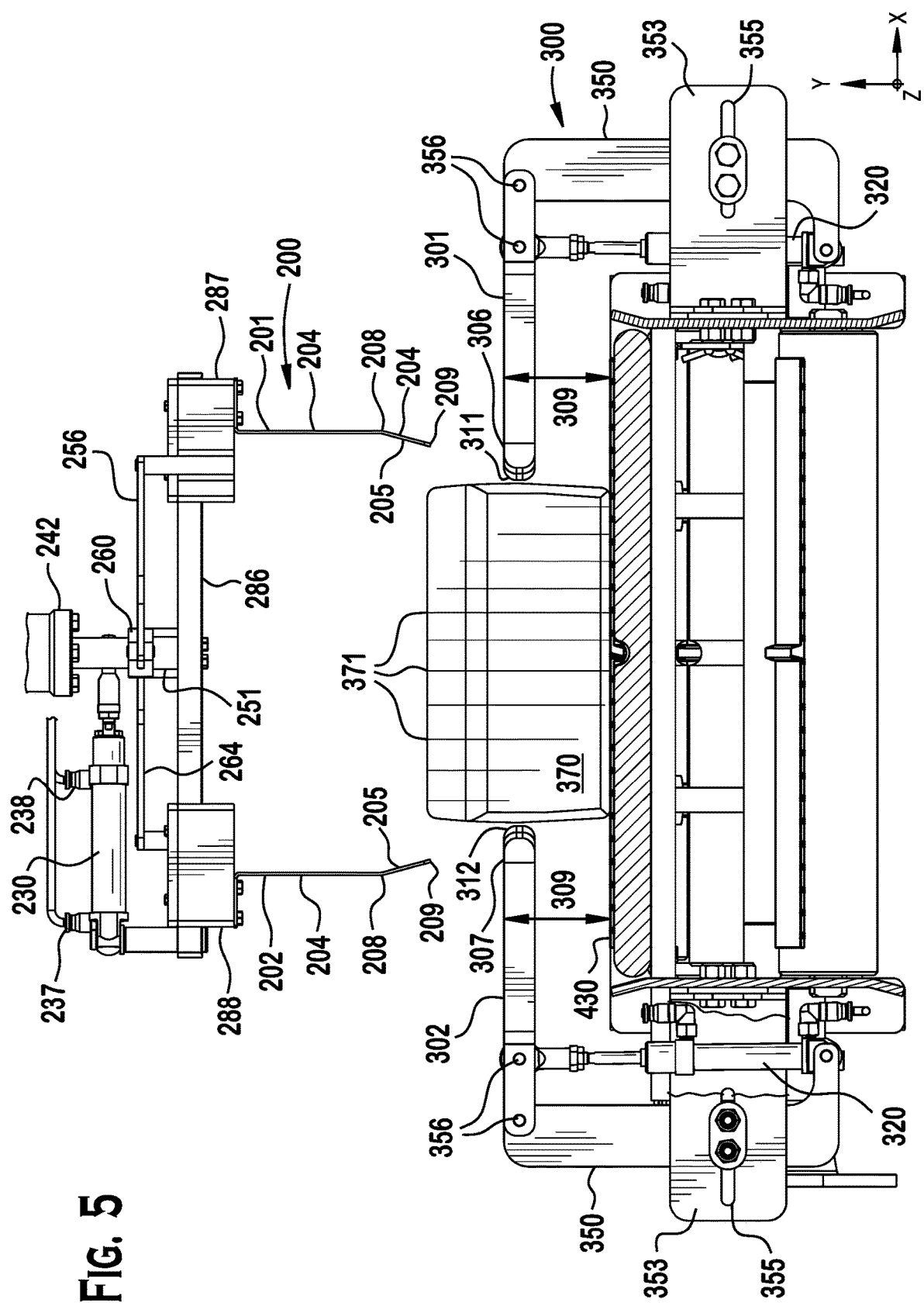
FIG. 5 is a front view of a bread handler according to the invention shown in use.

As shown, in FIGS. 1, 2 and 5, the gripper assembly 200 moves into an absolute position of the segmented product 370 as the segmented product 370 reaches the first paddle 301 and the second paddle 302. The first arm 201 and the second arm 202 are positioned in the vertical y-direction above the segmented product 370 and are aligned with the segmented product 370 in the horizontal x-direction and track the segmented product 370 in the longitudinal z-direction in a sweeping motion aligning with the segmented product 370, which is moving on the conveyor belt 430, until the gripper assembly 200 is aligned with the segmented product 370 in the longitudinal z-direction.

Figure 6:
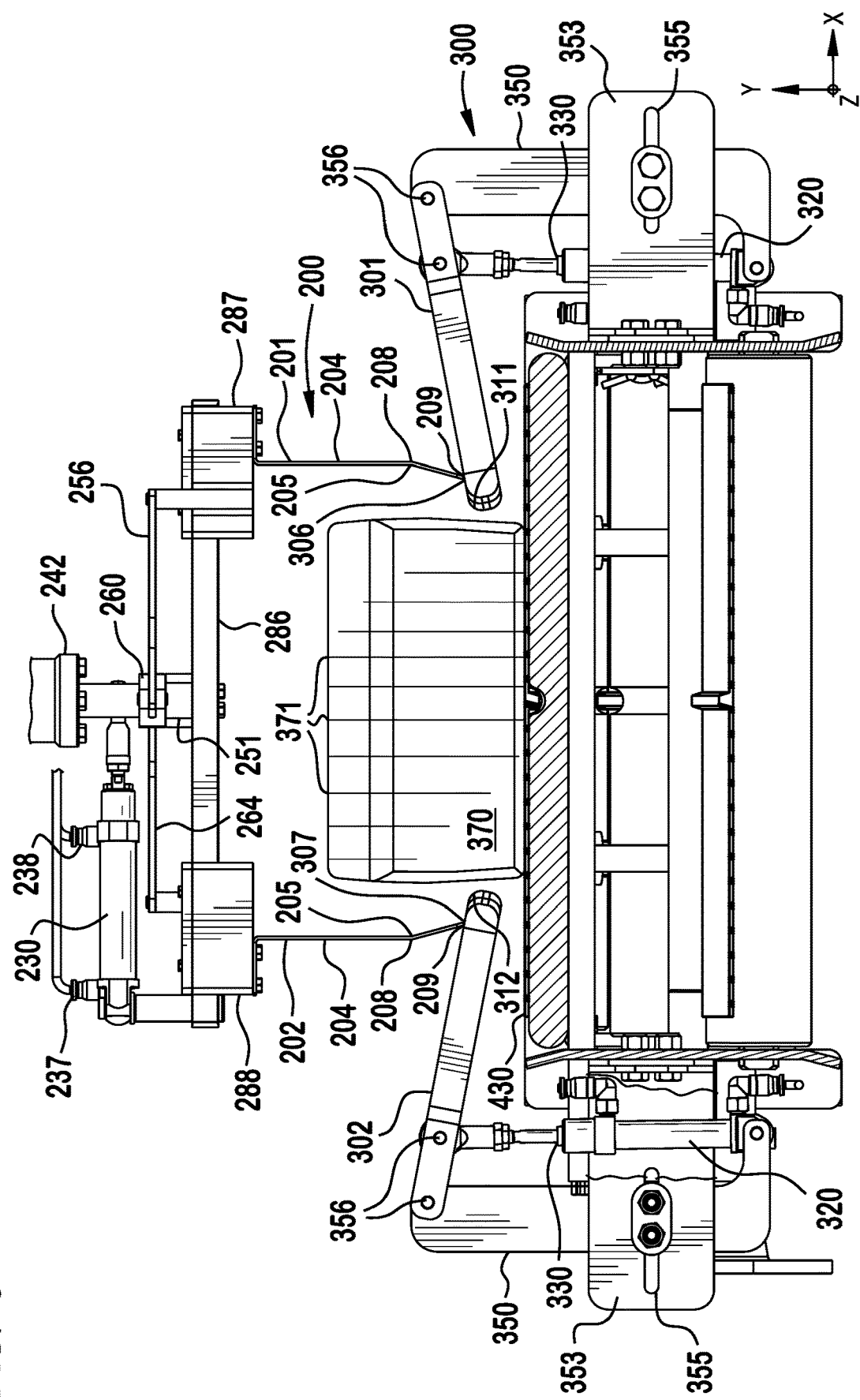
FIG. 6 is a front view of a bread handler according to the invention shown in use.

Once the robotic arm 500 with gripper assembly 200 has matched the movement of the segmented product 370 along the conveyor belt 430 the gripper assembly 200 with the first arm 201 and the second arm 202 move into an engagement width along the slide arm guide 287 and the slide arm guide 288. The robotic arm 500 positions the gripper assembly 200 with the first arm 201 and the second arm 202 along and down into contact with the first paddle 301 and the second paddle 302 along the lower end 209 of the first arm 201 and the second arm 202. The lower end 209 on the first arm 201 contacts the first paddle 301 along the first arm engagement position 306 and the lower end 209 on the second arm 202 contacts the second paddle 302 along the second arm engagement position 307 depressing the first paddle 301 and the second paddle 302 simultaneously along the pivotally connected pneumatic pistons 320. When the first arm 201 and the second arm 202 reach the bottom of their downward movement at the first engagement position 306 and the second engagement position 307, just prior to the first arm 201 and the second arm 202 being actuated by an air pressure in a horizontal x-direction, the first paddle 301 and the second paddle 302 are fully engaged to the pneumatic piston 320 pivotally connected to the first paddle 301 and the pneumatic piston 320 pivotally connected to the second paddle 302 are both simultaneously in a fully compressed position 330 as shown in FIGS. 6 and 12.

Figure 7:
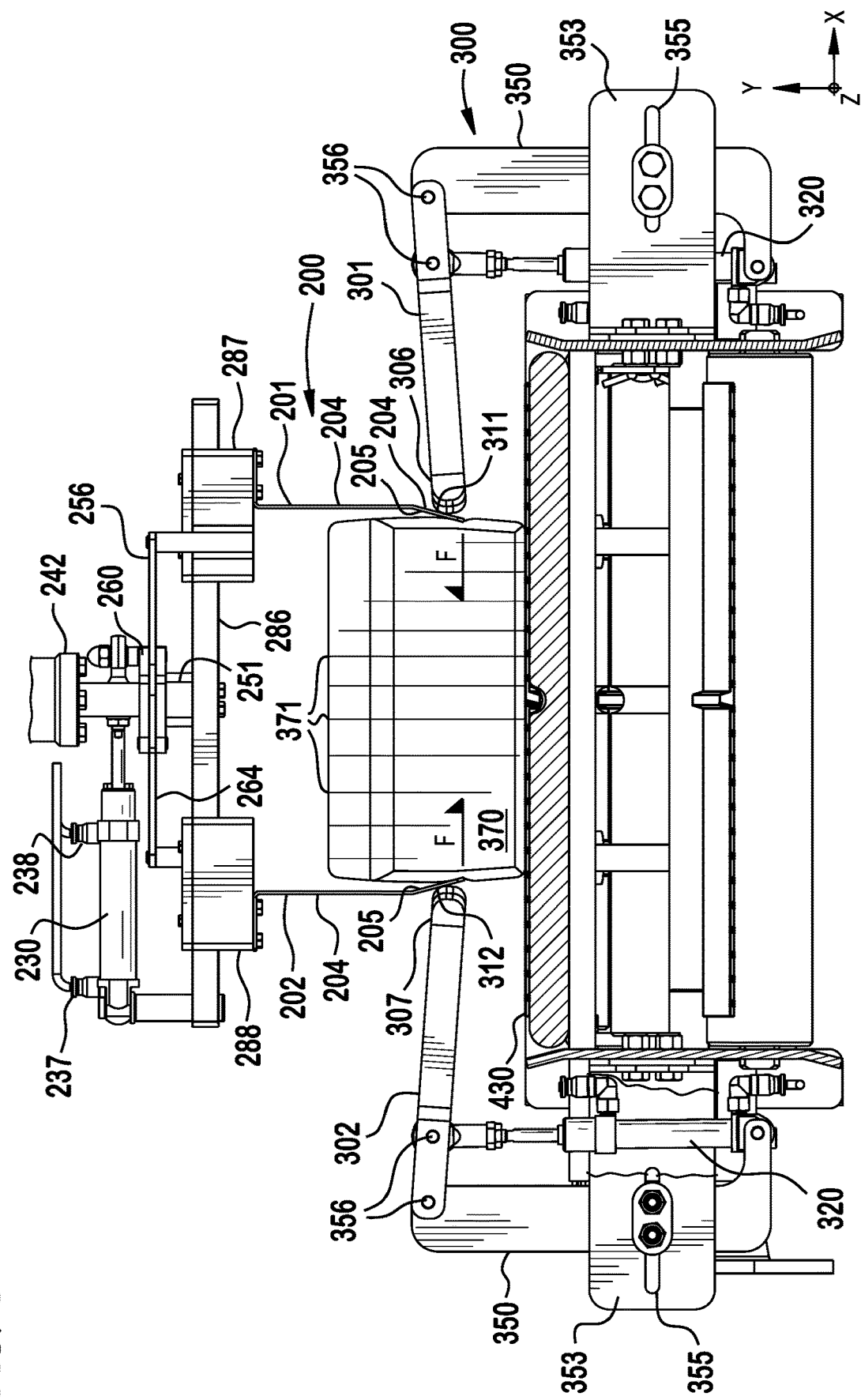
FIG. 7 is a front view of a bread handler according to the invention shown in use.
Figure 9:
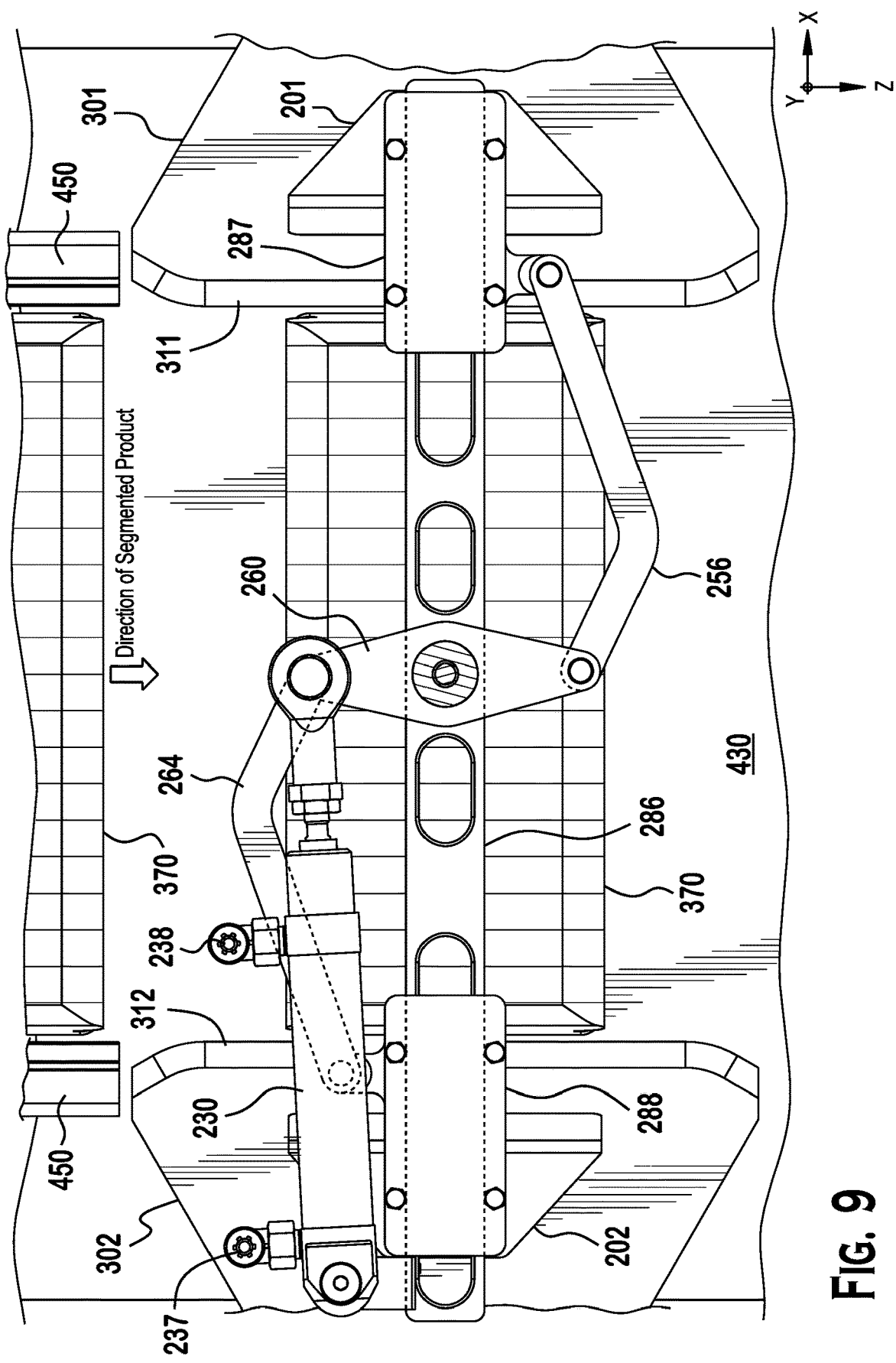
FIG. 9 is a top view of a bread handler according to the invention shown in use.
Figure 10:
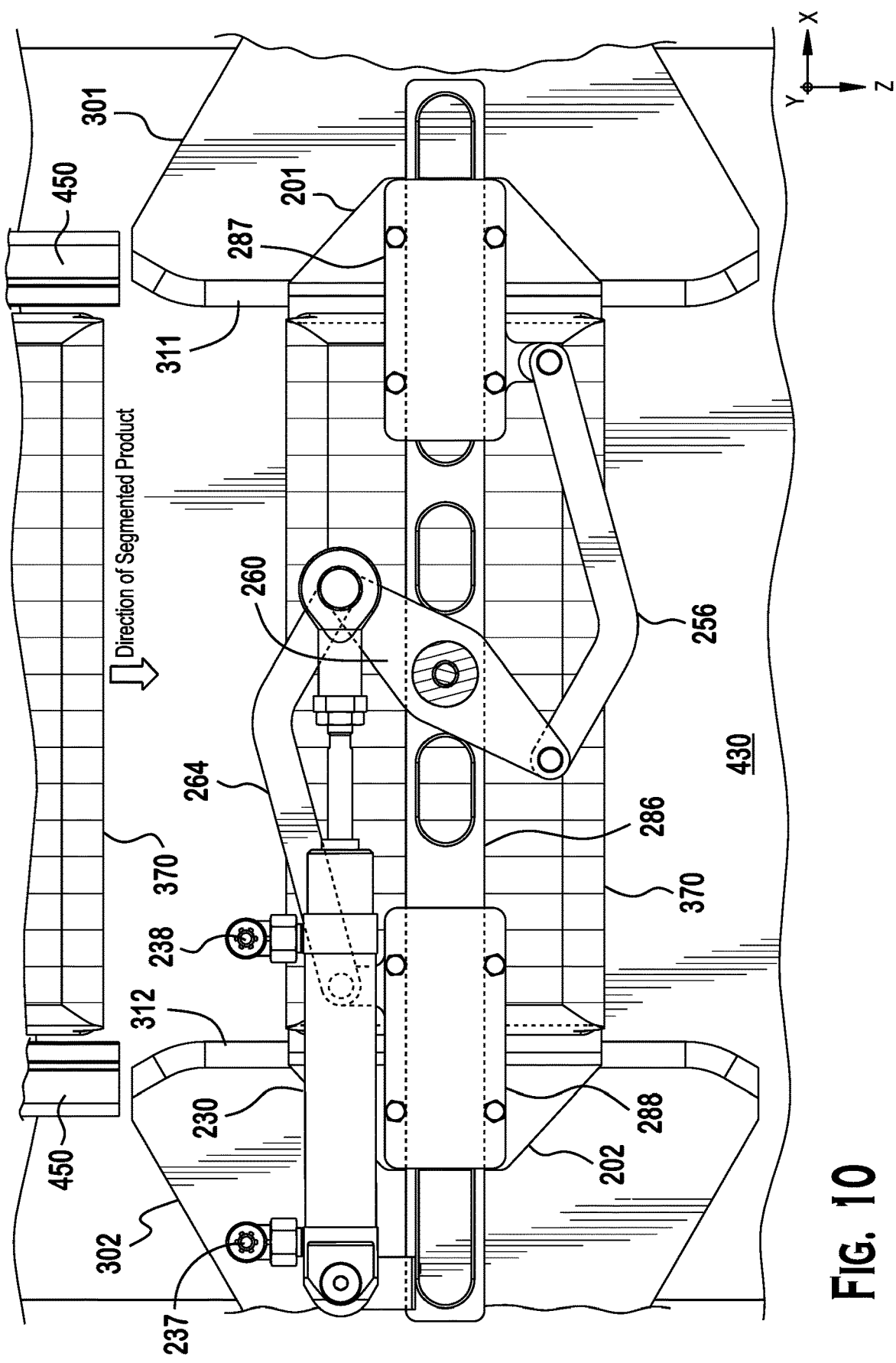
FIG. 10 is a top view of a bread handler according to the invention shown in use.

As shown in FIGS. 7, 9, and 10, the pneumatic piston 230 is energized by a compressed gas such as air through the air input port 237. The pneumatic piston 230 directly drives the second drive arm 264 rotating the rotational drive coupler 260 about the mounting shaft 251 pulling the first drive arm 256 toward the second arm 202 in the horizontal x-direction. As a result the slide arm guide 287 with the first arm 201 and the slide arm guide 288 with the second arm 202 converge in the horizontal x-direction along the slotted slide rail 286.

At the distal interior end of each lead surface 204 below the elbows 208 the grip surfaces 205 apply a pneumatically adjustable clamping force F on the segmented product 370 perpendicular to a plane formed in the segmented product 370 along each end in the longitudinal z-direction and the vertical y-direction. The clamping force F is adjustable for various types and sizes of segmented product 370 such that excessive force does not occur. The clamping force F is adjustable by modulating an air pressure in the pneumatic piston 230 by an air pressure regulator. The air pressure regulator can be set at a variety of air pressures so that the clamping force F is not excessive for the particular segmented product 370.

As the plurality of the grip surfaces 205 apply the clamping force F to the segmented product 370 the outer portion of the first arm 201 and the outer portion of the second arm 202 deflect the first paddle 301 and the second paddle 302 along the first innermost radiused edge 311 and the second innermost radiused edge 312 until a sufficient clamping force F has been applied to the segmented product 370 such that the first arm 201 and the second arm 202 have moved inward along the slotted slide rail 286 a sufficient compressive distance to disengage from the first paddle 301 and the second paddle 302 without excessively compressing, damaging, or decoupling the segmented product 370.

Figure 8:
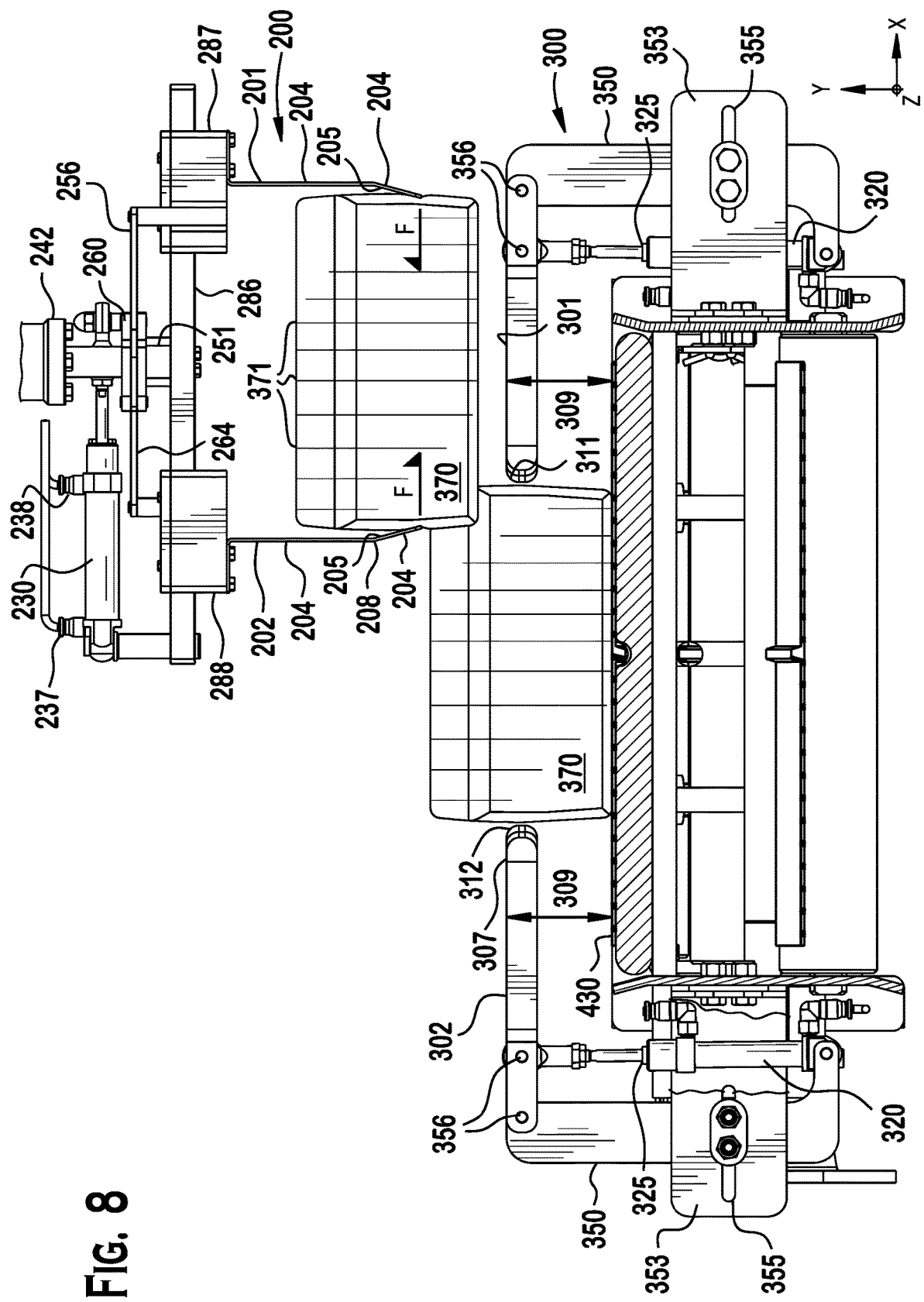
FIG. 8 is a front view of a bread handler according to the invention shown in use.

As shown in FIGS. 1 and 8 once the first paddle 301 and the second 302 are disengaged from the first arm 201 and the second arm 202 the robotic arm 500 and gripper assembly 200 move upward in a vertical y-direction and sweep in a longitudinal z-direction and a horizontal x-direction to a packaging machine (not shown).

The conveyor belt 430 continues the feeding of segmented products 370 as shown in FIGS. 1 and 8, the robotic arm 500 with the gripper assembly 200 repeats until all segmented products 370 have been transferred to the packaging machine (not shown). One of ordinary skill in the art would understand that while the segmented product 370 as illustrated is a type of bread that the device as described and illustrated can be practiced on any variety of products whether segmented or unsegmented.

The foregoing illustrates some of the possibilities for practicing the invention. Many other embodiments and fields of use for the bread handler 1 are possible and within the scope and spirit of the invention. It is, therefore, intended that the foregoing description be regarded as illustrative rather than limiting.

What is claimed is:

1. A robotically operated bread handler comprising:
   a plurality of paddles on opposing sides, and
   a gripper having two opposing arms adjustable in a width direction, each arm having a lead surface and a grip surface applying a pneumatically adjustable clamping force on a segmented product, each lead surface positioned to engage and displace one of the paddles with a downward motion.

2. The bread handler of claim 1, wherein each one of the plurality of paddles has an innermost radiused edges.

3. The bread handler of claim 2, where the plurality of paddles innermost radiused edges are deflected downward when engaged by the gripper arms.

4. The bread handler of claim 2, wherein each of the innermost radiused edges engage one of the lead surfaces.

5. The bread handler of claim 2, wherein the paddles are biased in a vertical direction when disengaged from the gripper arms.

6. The bread handler of claim 1, wherein each of the plurality of paddles has a pivot point at an outermost narrow reduced edge opposite the innermost radiused edge.

7. The bread handler of claim 4, wherein each of the plurality of paddles are located adjacent a conveyor rail with the innermost radiused edge positioned flush with an innermost collinear surface of the rail along.

8. The bread handler of claim 7, wherein the plurality of paddles are positioned at a same height as the conveyor rail.

9. The bread handler of claim 6, wherein the plurality of paddles are adjustable in a width direction.

10. The bread handler of claim 1, wherein the paddles each have a substantially triangular shape.

11. The bread handler of claim 5, wherein each one of the plurality of paddles is biased in the vertical direction by a pneumatic piston.

12. The bread handler of claim 7, wherein the conveyor rail is adjustable along a length of a conveyor belt.

13. The bread handler of claim 12, wherein the conveyor rail supports a segmented food from decoupling along a portion of a gripper sweeping motion.

14. The bread handler of claim 13, wherein the gripper follows a sweeping motion in a longitudinal direction.

15. The bread handler of claim 1, wherein a depth in a y-direction and a travel of the gripper in the x-direction are variable depending upon the type of a segmented product on a conveyor to be gripped.

16. The bread handler of claim 1, gripping a segmented product at an absolute position of the product on a conveyor belt.

17. The bread handler of claim 16, wherein the segmented product is segmented in a plurality of vertical segments in a y-direction along the width of the product in an x-direction.

18. The bread handler of claim 11, wherein the pneumatically adjustable clamping force is perpendicular to the segmented product.

19. A robotically operated bread handler, comprising:
   a conveyor rail;
   a plurality of paddles on opposing sides and located adjacent and abutting the conveyor rail along an edge thereof, the plurality of paddles positioned flush with an innermost collinear surface of the conveyor rail, each of the plurality of paddles having a pivot point at an outermost narrow reduced edge opposite an innermost edge; and
   a gripper having two opposing arms each arm having a lead surface and a grip surface, each of the lead surface positioned to engage and displace one of the paddles with a downward motion.

20. The bread handler of claim 19, wherein the plurality of paddles are positioned at a same height as the conveyor rail.

21. The bread handler of claim 19, wherein the plurality of paddles are adjustable in a width direction.

22. The bread handler of claim 19, wherein the conveyor rail is adjustable along a length of a conveyor belt.

23. The bread handler of claim 22, wherein the conveyor rail supports a segmented food from decoupling along a portion of a gripper sweeping motion.

24. The bread handler of claim 23, wherein the gripper follows a sweeping motion in a longitudinal direction.

* * * * *